US005802360A

United States Patent [19]
Fernando

[11] Patent Number: 5,802,360
[45] Date of Patent: Sep. 1, 1998

[54] DIGITAL MICROPROCESSOR DEVICE HAVING DNAMICALLY SELECTABLE INSTRUCTION EXECUTION INTERVALS

[75] Inventor: John Susantha Fernando, Coopersburg, Pa.

[73] Assignee: Lucent Technologies Inc., Murray Hill, N.J.

[21] Appl. No.: 640,590

[22] Filed: May 1, 1996

[51] Int. Cl.$^6$ .................................................. G06F 9/00
[52] U.S. Cl. .............................. 395/570; 395/567; 395/568
[58] Field of Search .............................. 395/570, 567, 395/568

[56] References Cited

U.S. PATENT DOCUMENTS

| | | | |
|---|---|---|---|
| 4,460,972 | 7/1984 | Homan et al. | 395/570 |
| 4,835,681 | 5/1989 | Culley . | |
| 4,868,739 | 9/1989 | Ngai et al. . | |
| 5,136,969 | 8/1992 | Beckwith et al. | 395/587 |
| 5,313,621 | 5/1994 | Chan . | |
| 5,325,495 | 6/1994 | McLellan | 395/395 |
| 5,335,331 | 8/1994 | Murao | 395/389 |
| 5,404,466 | 4/1995 | Inoue | 395/568 |
| 5,625,806 | 4/1997 | Kromer | 395/556 |

*Primary Examiner*—Krisna Lim

[57] ABSTRACT

A scheme for variable-delay instructions in a digital processor that allows for variable delay of some instructions to increase performance at different frequencies. The variable-delay (VD) feature allows flag-modifying instructions to execute in a differing number (1 or 2) of clock cycles, depending on the application. In applications that clock the processor at less than maximum frequency, instructions that modify the flag are executed in one clock cycle. In applications that clock the processor at its maximum frequency, the instructions that modify the flag are executed in two clock cycles. If the critical path, and consequently the maximum frequency, of a processor is determined by a flag-modifying operation immediately followed by a flag-reading operation, then the VD scheme helps increase performance at either frequency. The performance increase is proportional to the difference in delays between the critical path associated with flag-modifying and other critical paths. At the lower frequency, a given application consumes slightly less energy and the cost of implementing the scheme is minimal.

26 Claims, 4 Drawing Sheets

XREADY=(XIDLE & !MCFC) + (XBUSY & MCLC) + RESET

DIGITAL MICROPROCESSOR DEVICE HAVING DNAMICALLY SELECTABLE INSTRUCTION EXECUTION INTERVALS

FIELD OF THE INVENTION

The present invention relates generally to microprocessor devices, and more particularly to a scheme for optimizing the performance of such microprocessor devices.

BACKGROUND OF THE INVENTION

Digital processors including microprocessors, microcontrollers and digital signal processors are well-known devices used in many consumer and non-consumer applications today. As would be understood by a person skilled in the art, every processor has a maximum (clock) frequency at which it can reliably operate. An embedded processor targeted at a variety of applications may not, however, require running at the maximum frequency in some applications, like a wireless handset, while in other applications higher performance is desired. Moreover, in some applications the clock frequency may be reduced dynamically for power control. A standard practice is to offer a low-frequency processor and a high-frequency processor with higher performance at a higher price. If a single processor is to satisfy both frequencies, the simple approach is to design for higher frequency and reduce the clock to any desired lower frequency. In such an approach the performance at the lower frequency is typically sub-optimal because the processor design may have compromised performance at the lower frequency in favor of pushing the maximum frequency.

The maximum frequency of a processor (or any clocked logic), is determined by the signal path with the greatest delay. Signal paths which have delays close to the greatest are called the critical paths. To increase the maximum frequency of a clocked part requires reducing the delays of the critical paths. In the design of a processor with attributes of compact code, low branch penalty, and low cost, critical paths associated with some 1-clock instructions may be significantly greater than other critical paths. For example, a designer has to compromise between low branch penalty at a lower clock rate, and a higher branch penalty at a higher clock rate. The branch penalty is usually a fixed number of clocks. If the design choice is to have a processor that can operate at the higher frequency, then the branch penalty reduces the performance at the lower frequency. Accordingly, there is a need for a processor device that eases the compromise between instruction execution time and clock rate.

SUMMARY OF THE INVENTION

The present invention is a scheme that allows for variable delay of some instructions in a microprocessor, thus easing the above compromise. The variable-delay (VD) feature allows flag-modifying instructions to execute in a different number of clocks, depending on the application. For example, in applications that clock the microprocessor at less than maximum frequency, instructions that modify the flag are executed in one clock cycle. In applications that clock the microprocessor near its maximum frequency, the instructions that modify the flag are executed in two clock cycles.

In one embodiment of the present invention, a device is described which is adapted for use with a microprocessor having an instruction set including flag-modifying and flag-reading instructions. The microprocessor includes a decode stage for decoding an instruction from the instruction set and an execute stage for executing the instruction. The device includes combinatorial logic coupled to the execute stage, and a mode input coupled to the combinatorial logic. The combinatorial logic is operable to force the execute stage to execute a flag-modifying instruction in two clock cycles when the mode input is enabled and when a flag-reading instruction is present in said decode stage and a flag-modifying instruction is present in the execute stage. The flag-modifying instruction is executable in one clock cycle when the mode input is disabled.

BRIEF DESCRIPTION OF THE FIGURES

For a better understanding of the present invention, reference may be had to the following description of exemplary embodiments thereof, considered in conjunction with the accompanying drawings, in which.

DETAILED DESCRIPTION

The present invention sets forth a variable-delay (VD) scheme for certain instructions contained in the instruction set of a digital microprocessor thereby allowing for different execution times. This enables optimal performance for a single processor, for example, an integrated circuit microprocessor, microcontroller or digital signal processor at different operating frequencies. The branch penalty problem is a common example of the general case of a flag-modifying instruction followed by a flag-reading instruction. The problem is more clearly illustrated in a common instruction sequence of a compare instruction followed immediately by a branch instruction which typically occurs in a loop as shown below.

| L1: | MOV r3, r2 | # First instruction in loop (target of branch) |
| | ... | |
| | ... loop body | |
| | ... | |
| | CMP.eq r1, $0 | # If loop counter r1 is zero set flag bit |
| | BRA.iff L1 | # Branch to L1 if flag is not set |
| | ADD r3, r2 | # First instruction after loop |

Figure 1:
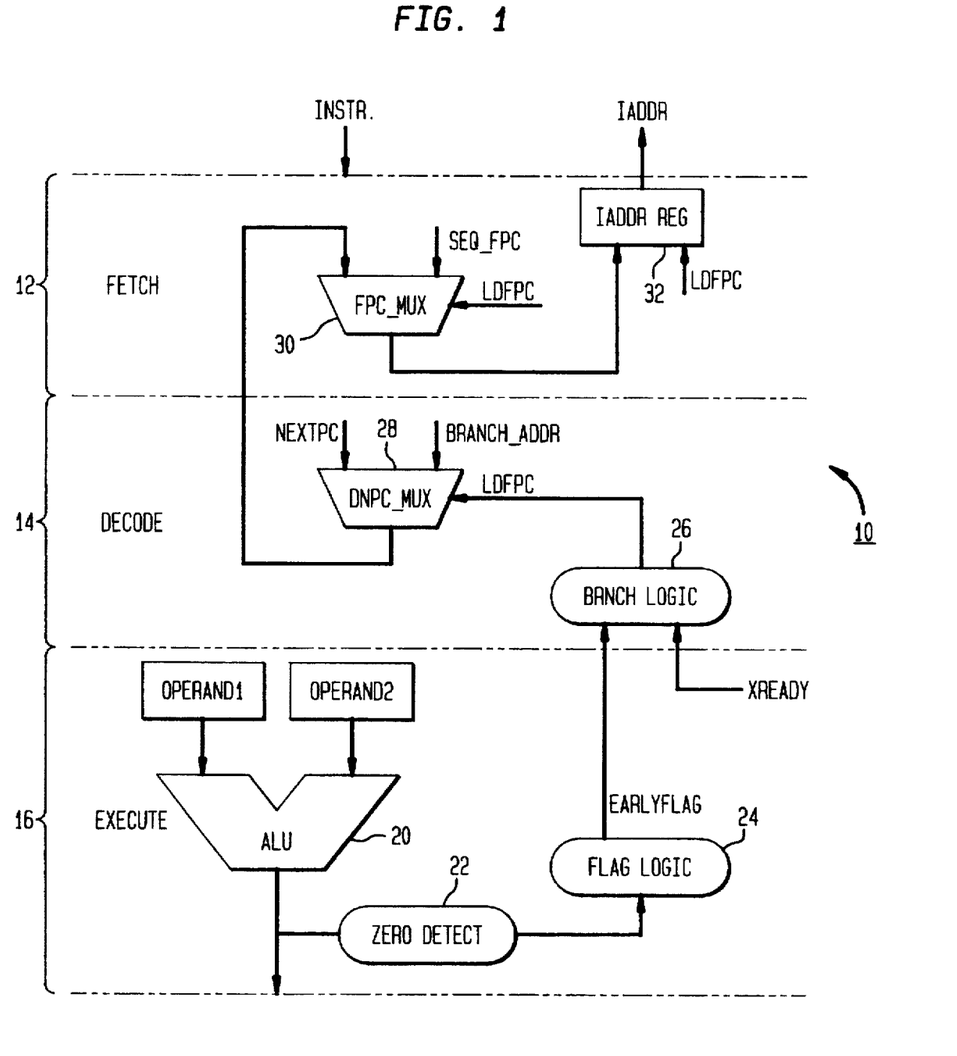
FIG. 1 shows one embodiment of processor pipeline having a flag signal critical path as described in accordance with the present invention.

Referring to FIG. 1, the critical path associated with the above instruction sequence is shown for an exemplary digital processor 10. FIG. 1 shows a fetch stage 12, decode stage 14 and execute stage 16 as part of the critical path for the pipeline of the processor 10. For the instructions contained in loop 1 above, assume that in clock N the CMP instruction is in the execute stage 16, the branch instruction is in the decode stage 14, and the ADD instruction has been fetched. Typically all instructions execute in 1 clock and assume that the memory latency is also 1 clock. In a low-cost digital microprocessor design (e.g., with no branch prediction), the branch cannot be completed until the flag is determined. When the branch is taken the next instruction is not the ADD, but the MOV which must be fetched. Thus, the pipeline stalls for a few cycles (until the MOV is fetched) and this is termed the branch penalty.

As shown in FIG. 1, the critical path begins in the ALU 20, runs through zero detect logic 22, flag logic 24, branch logic 26 and controls a DNPC MUX ( decode program counter multiplexer) 28 and a FPC MUX ( fetch program counter multiplexer) 30 and ends in an IADDR (instruction) register 32 which must be loaded with the address of the next instruction to be fetched, in this case, the MOV instruction. During normal (sequential) instruction processing, the fetch stage 12 fetches sequentially (using SEQ_FPC input), and the decode stage 14 increments its PC (program counter) sequentially (using NextPC). When a branch is taken, the LDFPC (Load Fetch PC) signal routes the branch address via the DNPC and FPC muxes 28, 30 and loads it into the IADDR register 32. Thus, the next fetch address becomes the address of the branch target (the MOV).

Figure 2:
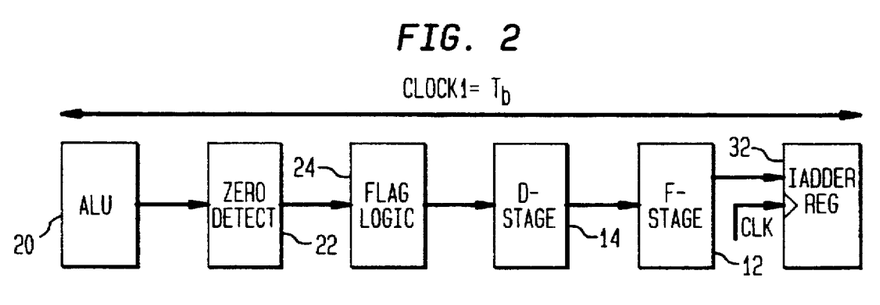
FIG. 2 shows the flag signal path for an exemplary processor implemented in a single clock.

As would be understood, the branch penalty depends on how the critical path is partitioned into clock cycles. For instance, as shown in FIG. 2, the entire path may be crammed into 1 cycle for a branch penalty of 1 clock, or split into two clocks for a branch penalty of two clocks as in FIG. 3. If the branch penalty is 1 clock, the maximum frequency is Fb=1000/Tb MHz, where Tb is the critical path (in nanoseconds) shown. If the branch penalty is two clocks the maximum frequency is given by Fc=1000/Tc MHz, where Tc is the next most critical path of the processor besides the one shown. Furthermore, Tb/2<Tc<Tb, which implies that Fc is somewhere between Fb and 2Fb, and this depends on the specific design.

If a typical program contains about 15% to 20% branches and performance is measured by the time taken to execute the entire program, then fixing the branch penalty at 2 clocks maximizes performance by achieving a higher maximum frequency (Fc). At Fb, however, the design with the 2-clock branch penalty has less performance than a design with 1-clock branch penalty.

Figure 3:
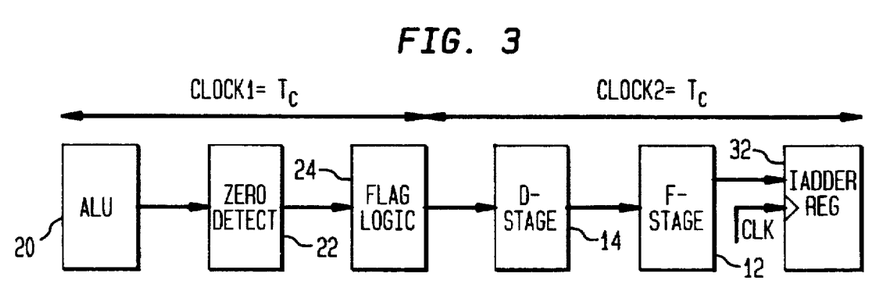
FIG. 3 shows the splitting of the flag signal path in response to a TK2CLKS input of the present invention.

The goal of the present invention variable-delay (VD) scheme is to provide optimal performance at both frequencies. The present invention does so by having an input, referred to herein as TK2CLKS (take-2-clocks), to the processor that determines how many clocks (1 or 2) are to be taken in executing code sequences like the one shown. The input may be set statically (hardwired or set during initialization) or dynamically. In any case, it is clear that the critical path must be split into 2 according to the input TK2CLKS. FIGS. 2 and 3 show an example of delays for the flag signal path in a digital processor according to the present invention. The delays in the flag signal path include delays associated with the ALU 20, zero detect logic 22, flag logic 24, decode stage 14, fetch stage 12 and loading of the instruction address register 32. As shown in FIG. 3, for maximum frequency, or frequencies higher than Fb, the path is split into 2 (TK2CLKS=1), and for operation at frequencies less than Fb, the path is left intact (TK2CLKS=0) as in FIG. 2. Thus, when TK2CLKS=1 a stall cycle is introduced into the execution of the CMP (or other flag setting or modifying instruction) which allows the critical path to propagate through the decode and fetch stages 14, 12, respectively.

The VD feature of the present invention may be implemented with a relatively simple hardware modification to a digital microprocessor so that introduction of the stall cycle is controlled by the TK2CLKS input. In accordance with the present invention, an exemplary processor (pipeline) incorporating the VD scheme includes 4 stages. As shown in FIG. 1, these stages include the fetch stage 12, decode stage 14, execute stage 16, plus a writeback stage (not shown). The decode stage 14 has its own adder to compute branch addresses. Thus branch and call instructions do not use the ALU 20 in the execute stage 16. The fetch stage 12 continues fetching instruction words (for example, 16-bit and 32-bit instructions) sequentially into an instruction queue. The decode stage 14 decodes the instruction at the head of the queue. If the instruction is an unconditional branch, or an unconditional call instruction, the IADDR register 32 of the fetch stage 12 is loaded with a new instruction address (specified by the call or branch instruction) by asserting the LDFPC (Load Fetch PC) signal. The LDFPC signal is not asserted if within the branch logic 26, XREADY=0. This ensures there is no out-of-order execution. In this case, the pre-fetched instructions in the queue are discarded and subsequent instructions are then fetched beginning at the new address. The decode stage 14 idles until the first instruction is fetched. When a conditional instruction, i.e., an instruction that looks at the value of the flag, is decoded, the decode stage 14 reads an EARLYFLAG signal from the flag logic 24 of the execute stage 16. If the condition is met the new instruction address is loaded in a manner similar to an unconditional branch/call.

Figure 4:
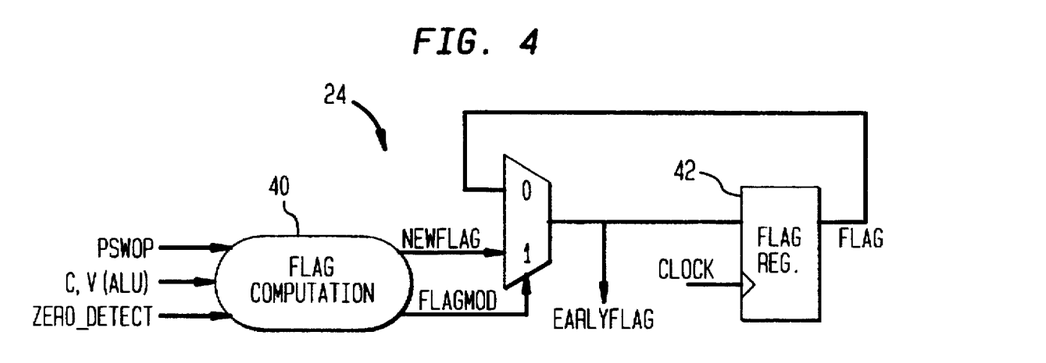
FIG. 4 shows one embodiment for the flag logic incorporated in a processor operable in accordance with the present invention.

As would be understood, the EARLYFLAG signal indicates the latest flag value. If a flag-modifying instruction is in the execute stage, the decode stage 14 must wait for EARLYFLAG to settle before it can evaluate the condition required by the instruction in the decode stage. Referring to FIG. 4 in connection with FIG. 1, details are shown for the design of the flag logic 24 included within the processor. The flag computation logic 40 includes an input from PSWOP (Program Status Word Operation), C,V bits from the ALU 20 and ZERO_DETECT from the zero detect logic 22. The PSWOP is defined by the decode for each instruction and indicates the bits in the PSW register that are to be modified by the execute stage 16. In the instant embodiment of the processor, the Flag bit is one of the 8 bits in the PSW register. When the PSWOP indicates that the Flag bit must be modified, then FLAGMOD=1 and the NEWFLAG value is selected, which allows the latest flag value to be stored in flag register 42 and which generates the EARLY FLAG signal. For example, if the instruction in the execute stage is a CMP.eq (compare and check if equal), then NEWFLAG takes the value of ZERO_DETECT (which is one if the ALU output is zero). As FIG. 1 indicates, the new value must propagate to the decode and fetch stages 14, 12 in 1 or 2 clocks.

As discussed above, the Flag referred to in the context of the present invention, refers to a specific bit, for example Bit_0, of the PSW (program status word) register which in this case includes 8 bits. As would be understood by a person skilled in the art, the flag may be modified by a number of different instructions. Some examples of these instructions include: bit.clear, bit.test, bit.set, cmp.eq, cmp.gt (compare greater than), and testing of specific register bits, for example, test.c, test.j, test.p and test.v. Instructions in the instant embodiment of the present invention processor may also be provided with a ".eq0" extension, which sets the flag if the result of the operation is zero. Accordingly, these instructions would also be categorized as flag-modifying instructions. An exemplary list of instructions which can accept the .eq0 extension would include, but not be limited to: add, sub (subtract), and, or, xor, ld (load), ld.ub (unsigned byte), ld.uhw (unsigned half-word), ld.res (reservation bit), mov.fromctrl (move from control register), mov.toctrl, mov.toaltreg, mul (multiply), div (division), udiv (unsigned division), rem (remainder), urem (unsigned remainder), shl (shift left), shr (shift right), ushr (unsigned shift right).

In the present embodiment of the microprocessor, the flag is read by instructions having a ".ift" (if true) or ".iff" (if false) extension. For example, the instruction jmp.ift executes the jump if the flag is true (=1), and jmp.iff executes the jump if the flag is false (=0). Other instructions with the .ift or .iff extension are executed conditionally, which implies that if the condition is false, the instruction is converted to a NOP. As would be understood, a majority of the instructions can be assigned a conditional extension. These instructions include: add, sub, and, or, xor, mov.fromctrl (from control register), mov.toctrl, mul, div, udiv, shl, shr, ushr, crb.event (current register bank), crb.general, int0.en (interrupt zero enable), int0.dis, int1.en (interrupt one enable), int1.dis, jmp and mov. Some exceptions that cannot be executed conditionally would include: bit.test, cmp, kcall (kernel call), kret (kernel return), ld, ldm (load multiple), st (store), stm (store multiple), test.v, wfi (wait for interrupt).

Figure 5:
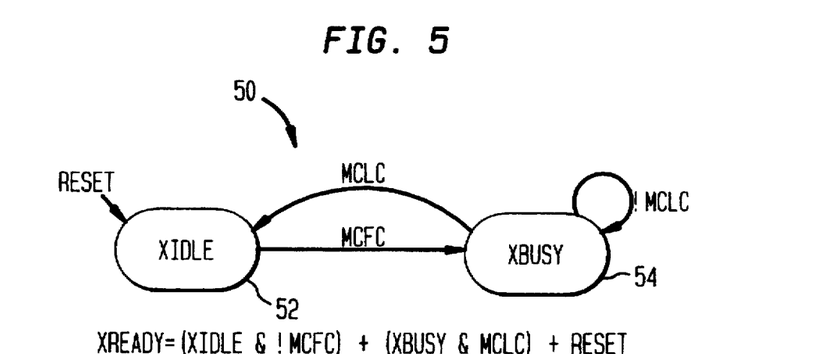
FIG. 5 shows a state diagram for the execute stage sequencer of the processor.

The decode stage 14 of the instant digital processor issues an instruction to the execute stage 16 when it has a valid instruction and the execute stage is idle. Most instructions take only 1 clock to execute, leaving the execute stage 16 ready (indicated by XREADY=1) for the next instruction. Referring to FIG. 5, a state diagram 50 is depicted for the status of the execute stage 16 and the handshake with the decode stage 14. As shown, the execute stage 16 has two states xidle 52 and xbusy 54. Multi-cycle instructions like MUL (multiply) or DIV (divide) put the execute stage into the busy mode for several cycles. Assume the execute stage is ready (XREADY=1). When a valid multi-cycle instruction is received, MCFC (multi-cycle first clock) is set, which also makes XREADY=0. On the last cycle of the multi-cycle instruction MCLC (multi-cycle last clock) is set, and so is XREADY. As will be described herein, a 1-lock instruction can be allowed to take 2 clocks by modifying MCFC and MCLC.

The VD scheme of the present invention may be implemented in a digital processor that operates as indicated above with some relatively simple modifications that are confined to the control logic of the execute stage 16. In defining operation of the present invention VD scheme, it can be seen that in essence the scheme does the following: when a flag-reading instruction is in the decode stage, and a flag-modifying instruction is in the execute stage, the execute stage takes 2 clocks to execute the instruction if the TK2CLKS mode is enabled. If the mode is not enabled it takes only 1 clock.

Accordingly, the processor must be provided with a (TK2CLKS) input to indicate whether to enable taking two clocks whenever a flag-modifying instruction is followed by a flag-reading instruction. As would be understood by a person skilled it the art, the "take 2 clocks" mode may be enabled at initialization by setting a configuration bit, or by an input pin on an integrated circuit package which may be controlled statically or dynamically. Thus, a variety of options exist for setting the mode, they do not, however, affect the general implementation.

A second step in implementing the VD scheme of the present invention is to identify the proper instruction sequence when the scheme may be used. As described previously, the decode stage 14 produces the FLAGMOD signal to identify when it has to use EARLYFLAG instead of FLAG. The decode stage 14 does so by setting a flip-flop (not shown) when it issues a flag modifying instruction to the execute stage 16. If the next instruction reads the flag, the flip-flop indicates that the FLAG is being computed in the execute stage and consequently the EARLYFLAG signal must be used instead. The FLAGMOD signal indicates this and is required for operation regardless of the VD scheme. To implement the VD scheme, the FLAGMOD signal must then also be provided to the execute stage 16.

Figure 6:
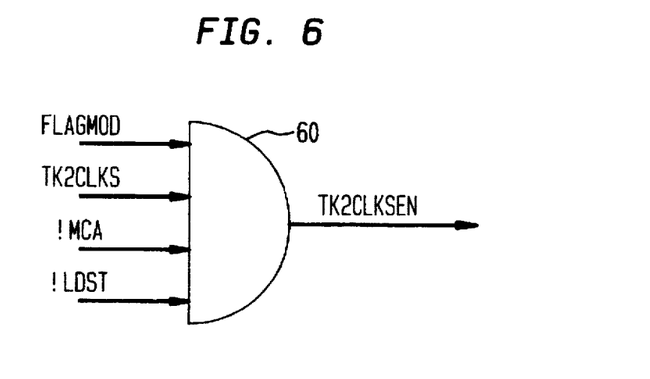
FIG. 6 and 7 show exemplary embodiments of combinatorial logic for using the TK2CLKS signal to implement the VD feature according to the present invention.

A TK2CLKSEN (take-2-clocks enable) signal is next produced so that when an instruction enters the execution stage, it can be identified as a 1-clock instruction (TK2CLKSEN=0) which is executed in 1 clock, or as a 1-clock instruction which must take 2 clocks (TK2CLKSEN=1). The TK2CLKSEN signal is produced by 'ANDing' the required conditions using AND gate 60 as shown in FIG. 6. FLAGMOD indicates that the proper instruction sequence has been identified, TK2CLKS indicates that VD is enabled, !MCA indicates this is not a multi-cycle arithmetic instruction (i.e. multiply or division related), and !LDST indicates it is not a load/store instruction.

Figure 7:
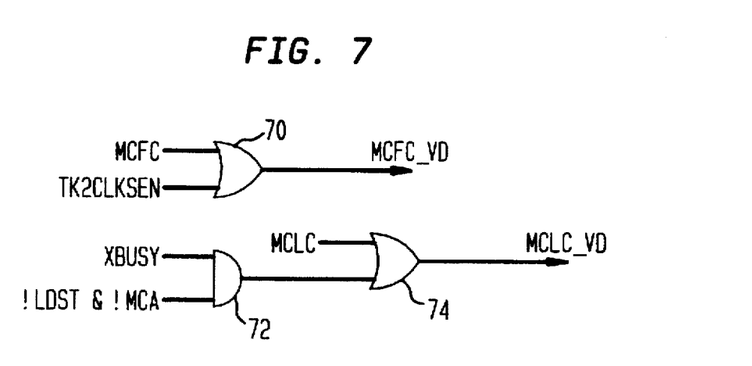

Production of the TK2CLKSEN signal requires modifying the MCFC (multi-cycle first clock) and MCLC (multi-cycle last clock) indicators. That is, in order to force the execute stage sequencer to take more than 1 clock requires MCFC to be asserted. Regardless of the VD mode, MCFC is asserted when a multi-cycle arithmetic instruction or load/store is encountered. Thus, the TK2CLKSEN condition is merely ORed to MCFC using gate 70 to produce a modified MCFC indicator, MCFC_VD as shown in FIG. 7. To limit the execution time to 2 clocks MCLC must be asserted on the second clock. FIG. 7 shows that this may be achieved by first "ANDing" the XBUSY signal with !LDST and !MCA signals. The output of AND gate 72 is then added to gate 74 as shown in order to produce a modified MCLC indicator, MCLC_VD. The new signals, indicated by $_{13}$ VD, as would be understood by a person skilled in the art, replace the old signals wherever they are used as inputs. Although the modified MCFC and MCLC signal are shown being produced by specific set of combinatorial logic, it would be understood that above signals may be produced utilizing other known combinations of combinatorial logic, wherein such combinations are intended to be covered as part of the present invention.

The present invention is advantageous in that no changes are required in the flag update mechanism if, flags are updated only in the last clock of the instruction (i.e., when XREADY=1). In addition, no modifications are necessary with respect to interaction with events (exceptions, faults, traps), since the only interruptions allowed in the middle of an instruction are restricted to multi-cycle arithmetic instructions (MUL or DIV). As would be understood, when the critical path, and consequently the maximum frequency, of an integrated circuit processor is determined by a flag-modifying operation immediately followed by a flag-reading operation, then the VD scheme helps increase performance at either frequency. The performance increase is proportional to the difference in delays between the critical path associated with flag-setting-reading and other critical paths. At the lower frequency, a given application consumes slightly less energy. Additionally, the cost of implementing the scheme is minimal.

Table 1 shows a performance comparison for the variable-delay (VD) scheme versus a fixed 2-clock scheme at low frequencies in an exemplary processor incorporating the designs described herein. Table 1 shows that the performance gained due to the VD feature at the lower frequency is about 9% to 12%. This is a significant gain considering the number of gates that are required to implement the feature is minimal. Moreover, power estimates show that the fewer clocks required with the VD feature contributes to a 3% saving in energy required for the benchmark. The only possible drawback of the scheme is that it adds to the verification task during the development and test phases.

TABLE 1

Performance Comparison at Low Frequency

| Scheme | Benchmark | Mem (clks) | Cycles | Speedup |
|---|---|---|---|---|
| Fixed 2-clk | B1 | 1 | 456730 | |
| VD | B1 | 1 | 407558 | 12% |
| Fixed 2-clk | B1 | 2 | 650266 | |
| VD | B1 | 2 | 622143 | 4.5% |
| Fixed 2-clk | B2 | 1 | 235928 | |
| VD | B2 | 1 | 216098 | 9.2% |
| Fixed 2-clk | B2 | 2 | 351136 | |
| VD | B2 | 2 | 338425 | 3.8% |
| Fixed 2-clk | B3 | 1 | 10969 | |
| VD | B3 | 1 | 10006 | 9.6% |
| Fixed 2-clk | B3 | 2 | 15720 | |
| VD | B3 | 2 | 14902 | 5.5% |

From the above, it should be understood that the embodiments described, in regard to the drawings, are merely exemplary and that a person skilled in the art may make variations and modifications to the shown embodiments without departing from the spirit and scope of the invention. For example, although the present invention is described with reference to a specific embodiment of an integrated circuit digital microprocessor, it would be understood that variable delay instruction scheme of the present invention may be adapted for use with other digital processing devices having comparable hardware capabilities, including micro processors, microcontrollers and digital signal processors. All such variations and modifications are intended to be included within the scope of the invention as defined in the appended claims.

What is claimed is:

1. An integrated circuit including a digital processor implementing an instruction set which includes flag-modifying and flag-reading instructions, said integrated circuit comprising:

a decode stage for decoding an instruction from said instruction set;

an execute stage coupled to said decode stage for executing said instruction; and a mode input coupled to said execute stage, wherein said execute stage is operable to execute a flag-modifying instruction present in said execute stage during an interval determined as a first integer multiple of a clock cycle for said processor when said mode input is enabled and a flag-reading instruction, which follows said flag-modifying instruction, is present in said decode stage, said flag-modifying instruction being executable during an interval determined as a second integer multiple of said processor clock cycle, said first integer multiple being greater than said second integer multiple, when said mode input is disabled.

2. The integrated circuit of claim 1, wherein said execute stage further includes control means for detecting said flag-reading instruction in said decode stage and said flag-modifying instruction in said execute stage.

3. The integrated circuit of claim 1, wherein said decode stage is operable to produce a flag modify signal upon issuing a flag-modifying instruction to said execute stage, said decode stage also being operable to produce a multi-cycle arithmetic indicator signal and a load/store indicator signal indicative, respectively, of a multi-cycle arithmetic and load/store instruction received therein, said execute stage including, combinatorial logic means coupled to said mode input and adapted to receive said flag modify signal, said multi-cycle arithmetic indicator signal and said load/store indicator signal, said combinatorial logic means operable to produce a two-clocks-enable signal at said execute stage when said mode input and said flag modify signal are enabled and said multi-cycle arithmetic indicator signal and said load/store indicator signal are absent, wherein presence of said two-clocks-enable signal identifies an instruction in said execute stage as an instruction to be executed in two clock cycles.

4. The integrated circuit of claim 3, wherein said execute stage produces a multi-cycle first clock (MCFC) signal indicative of a first clock cycle of a multi-cycle instruction, said execute stage including:

logic means having said MCFC and said two-clocks-enable signal input thereto, an output of said logic means coupled to a sequencer in said execute stage, wherein said logic means is operable to generate a modified MCFC indicator signal to force said sequencer to take more than a single clock cycle when executing an instruction in said execute stage.

5. The integrated circuit of claim 3, wherein said execute stage produces a multi-cycle last clock (MCLC) signal indicative of a last clock cycle of a multi-cycle instruction, said execute stage also operable to produce a busy signal indicative that said execute stage is engaged in execution of a multi-cycle instruction, said execute stage including:

second combinatorial logic means adapted to receive said busy signal, said multi-cycle arithmetic indicator signal and load/store indicator signal and said MCLC signal and operable to produce a modified MCLC signal, the presence of which alters execution of a one cycle instruction in said execute stage to two clock cycles.

6. The integrated circuit of claim 5, wherein said second combinatorial logic means includes a first logic stage operable to AND said busy signal with the NOT of said multi-cycle arithmetic indicator signal and load/store indicator signal; and a second logic stage operable to OR the output of said first logic stage with said MCLC signal to thereby produce said modified MCLC signal.

7. The integrated circuit of claim 3, wherein said combinatorial logic means includes means for performing an AND logic operation.

8. The integrated circuit of claim 1, wherein said mode input is enabled by means of a configuration bit.

9. The integrated circuit of claim 1, wherein said mode input is enabled by means of an input pin.

10. The integrated circuit of claim 3, wherein said logic means includes means for performing an OR logic operation.

11. The integrated circuit of claim 1, wherein said execute stage includes flag computational logic for modifying flags of said microprocessor in accordance with instructions executed in said executed stage.

12. The integrated circuit of claim 1, wherein a program status word operation is defined by said decode stage for each instruction decoded therein.

13. The integrated circuit of claim 1, wherein said flag-modifying instructions are selected from the group consisting of bit-clear, bit-test, bit-set, compare and test.

14. The integrated circuit of claim 1, wherein certain instructions in said instruction set are adapted to receive an extension to thereby become a flag-modifying instruction, said instructions selected from the group consisting of add, subtract, and, or, xor, load, load unsigned half-word, move, multiply, division, unsigned division, remainder, unsigned remainder, shift left, shift right, and unsigned shift right.

15. The integrated circuit of claim 1, wherein certain instructions in said instruction set are adapted to receive an extension to thereby become a flag-reading instruction, said instructions selected from the group consisting of add, subtract, and, or, xor, multiply, division, unsigned division, shift left, shift right, unsigned shift right, interrupt disable, interrupt enable, jump and move.

16. The integrated circuit of claim 1, wherein said device further includes a fetch stage for fetching instructions input thereto.

17. The integrated circuit of claim 1, wherein said second integer multiple is one.

18. A device adapted for use with a digital processor implementing an instruction set including flag-modifying and flag-reading instructions, said processor including a decode stage for decoding an instruction from said instruction set and an execute stage for executing said instruction, said device comprising:

combinatorial logic means coupled to said execute stage, and a mode input coupled to said combinatorial logic means, wherein said combinatorial logic means is operable to force said execute stage to execute a flag-modifying instruction during an interval determined as a first integer multiple of a clock cycle for said processor when said mode input is enabled and a flag-reading instruction present in said decode stage is followed by said flag-modifying instruction in said execute stage, said flag-modifying instruction being executable during an interval determined as a second integer multiple of said processor clock cycle, said first integer multiple being greater than said second integer multiple, when said mode input is disabled.

19. The device of claim 18, wherein said decode stage is operable to produce a flag modify signal upon issuing a flag-modifying instruction to said execute stage, said decode stage also being operable to produce a multi-cycle arithmetic indicator signal and a load/store indicator signal indicative, respectively, of a multi-cycle arithmetic and load/store instruction received therein, wherein said combinatorial logic means is adapted to receive said flag modify signal, said multi-cycle arithmetic indicator signal and said load/store indicator signal, said combinatorial logic means operable to produce a two-clocks-enable signal at said execute stage when said mode input and said flag modify signal are enabled and said multi-cycle arithmetic indicator signal and said load/store indicator signal are absent, wherein presence of said two-clocks-enable signal identifies an instruction in said execute stage as an instruction to be executed in two clock cycles.

20. The device of claim 19, wherein said execute stage produces a multi-cycle first clock (MCFC) signal indicative of a first clock cycle of a multi-cycle instruction, said execute stage including:

logic means having said MCFC and said two-clocks-enable signal input thereto, an output of said logic means coupled to a sequencer in said execute stage, wherein said logic means is operable to generate a modified MCFC indicator signal to force said sequencer to take more than a single clock cycle when executing an instruction in said execute stage.

21. The device of claim 20, wherein said execute stage produces a multi-cycle last clock (MCLC) signal indicative of a last clock cycle of a multi-cycle instruction, said execute stage also operable to produce a busy signal indicative that said execute stage is engaged in execution of a multi-cycle instruction, said execute stage including:

second combinatorial logic means adapted to receive said busy signal, said multi-cycle arithmetic indicator signal and load/store indicator signal and said MCLC signal and operable to produce a modified MCLC signal, the presence of which alters execution of a one cycle instruction in said execute stage to two clock cycles.

22. A method of operating a digital processor, said digital processor having a decode stage and an execute stage and including flag-modifying and flag-reading instructions in an instruction set thereof, said method comprising the steps of:

identifying a flag-reading instruction in said decode stage while a flag-modifying instruction is present in said execute stage;

checking the status of a mode input to said execute stage;

executing said flag-modifying instruction during an interval determined as a second integer multiple of a clock for said digital processor when said mode input is disabled, and executing said flag-modifying instruction during an interval determined as a first integer multiple of said processor clock cycle, said first integer multiple being greater than said second integer multiple when said status of said mode input is enabled.

23. The method of claim 22, wherein said decode stage is operable to produce a flag modify signal upon issuing a flag-modifying instruction to said execute stage, said decode stage also being operable to produce a multi-cycle arithmetic indicator signal and a load/store indicator signal indicative, respectively, of a multi-cycle arithmetic and load/store instruction received therein, said method further including the step of:

producing a two-clocks-enable signal at said execute stage when said mode input and said flag modify signal are enabled and said multi-cycle arithmetic indicator signal and said load/store indicator signal are absent, wherein presence of said two-clocks-enable signal identifies an instruction in said execute stage as an instruction to be executed in two clock cycles.

24. The method of claim 23, wherein said execute stage produces a multi-cycle first clock (MCFC) signal indicative of a first clock cycle of a multi-cycle instruction, said method including the step of:

generating a modified MCFC indicator signal based on said MCFC signal and said two-clocks-enable signal to force said sequencer to take more than a single clock cycle when executing an instruction in said execute stage.

25. The method of claim 24, wherein said execute stage produces a multi-cycle last clock (MCLC) signal indicative of a last clock cycle of a multi-cycle instruction, said execute stage also operable to produce a busy signal indicative that said execute stage is engaged in execution of a multi-cycle instruction, said execute stage including:

producing a modified MCLC signal based on inputs from said busy signal, said multi-cycle arithmetic indicator signal and load/store indicator signal and said MCLC signal, the presence of which modified MCLC signal alters execution of a one cycle instruction in said execute stage to two clock cycles.

26. The method of claim 22, wherein said second integer multiple is one.

* * * * *